Jan. 6, 1959  A. G. F. FOURÉS ET AL  2,867,209
ENDOSCOPIC DEVICES
Filed April 16, 1956

INVENTORS
Andre E. F. Fourés
Jean R. M. Girard
Robert L. M. De Montard
By Ralph B. Stewart
ATTORNEY United States Patent Office 2,867,209
Patented Jan. 6, 1959

2,867,209

ENDOSCOPIC DEVICES

André Gabriel François Fourés, Paris, Jean René Marie Girard, Boulogne-Billancourt, and Robert Louis Marie de Montard, Paris, France, assignors to Societe Française de Construction d'Appareils Medicaux, Paris, France Application April 16, 1956, Serial No. 578,524

Claims priority, application France May 4, 1955

11 Claims. (Cl. 128—6)

The present invention relates to an improved device for enabling endoscopic inspections or the like, of the kind mainly of those effected in practicing the medical art. It has for its general object to so provide this device that a practitioner may, under ordinary conditions of operation, firstly proceed to an inspection of an internal cavity or organ of the human body, either anatomically or surgically made available, and secondly proceed, if needed, to photograph this cavity or organ for testimony or studying purposes.

An important feature of the invention lies in the provision of an endoscopic probe which is of small cross-section and further includes, within a hollow elongated body, the whole of the lighting and optical means useful for such an endoscopic inspection, viz. a flash tube, a low-voltage inspection lamp and an optical system for bringing the light reflected from the internal cavity up to visual and/or photographic inspecting means.

Further objects and features of the invention will further appear from the following disclosure which relates to the accompanying drawings, wherein.

Figure 3:
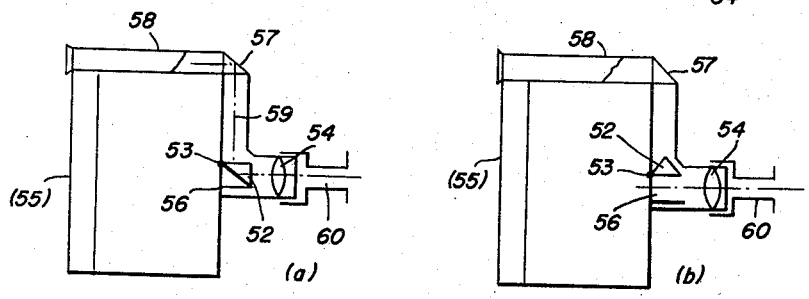
Figure 4:
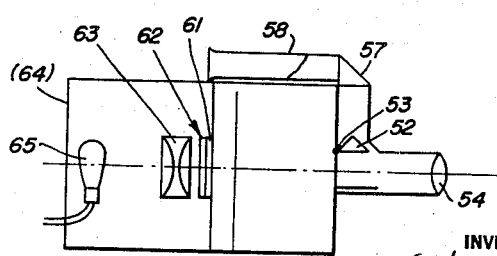

Fig. 3 gives the necessary information concerning the mechanical arrangement of the photographic camera included in this device; and, Fig. 4 indicates how this photographic camera may be converted, if needed, into an apparatus for the optical projection of the endoscopic pictures obtained with the device.

Figure 1:
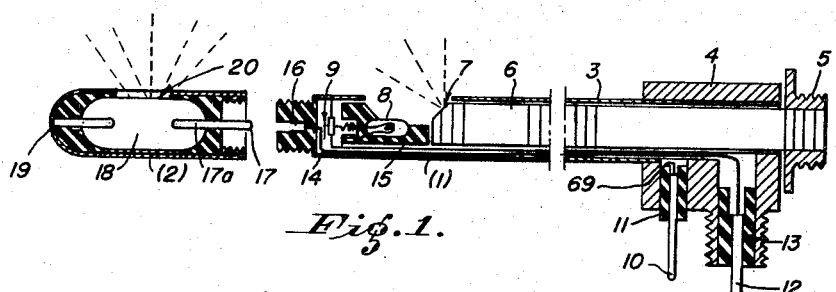
Fig. 1 shows a longitudinal section of an endoscopic probe according to the invention.

Referring to Fig. 1, wherein the representation is taken at an arbitrary scale for the sake of clearness, the hollow body of the probe comprises an end part 2 housing the flash tube 18 and a main part 1 upon which the part 2 may be screwed. When these parts are mechanically united, the pin 17 of the flash tube 18 comes within a socket 16 centered in an insulating spacer at the end of the part 1 so that the electrical terminal 17a of this tube is electrically connected to the insulated wire 14 which runs through the part 1 up to a sealed-in terminal 12. This terminal 12 is maintained through a dielectric spacer 13 within a tubulure in the part 4 integral to the hollow body 1 of the probe.

The other electrical terminal of the flash tube 18 is in straight-through contact at point 19 with the metallic part 2 of the probe. The flash tube is affixed within this part of the probe through a dielectric cement and it must be assumed that the outer wall of this tube is partly metallized, this metallization acting both as an activation electrode for the tube and as a reflector for the light flash from the tube. A window 20 is cut in the wall of the part 2 of the probe and, of course, it is the opposite side of the glass bulb of the tube which bears such a metallization. This metallization may be either formed upon the glass or applied thereto.

Behind the socket 16, in the part 1 of the probe, another socket is provided for a low-voltage filament lamp 8. A further insulated wire, not shown in Fig. 1 as not being in the plane of the shown cross-section therein, is passed along the wall 3, paralleling the wire 14, and connects to a spring terminal 9 of the socket of the lamp 8. This lamp may be set within a dielectric bed 15, provided with a metallization uniting the other electrical terminal of the said lamp 8 to the tube 3 of the probe. At its other end, this insulated wire connects to an input terminal 10 embedded within a dielectric block 11 and passing through a further tubulure of the body of the probe. Actually, for the sake of simplicity, these tubulures are provided integral to a sleeve 4 affixed to the hollow metal tube 3. At 69 is indicated the connection between the supply wire of the lamp 8 and its terminal 10.

In front of the low-voltage lamp 8 a further window is provided in the body 3 of the probe. The aperture of this window is such that not only it enables the light flux from the lamp 8 to pass to the outside, but it also ensures that any light reflected from the outside reaches the input 7 of an optical system 6 inserted in the remaining section of the probe. This optical system, actually a series of suitably assembled lenses, thus brings any light from the outside picked up at 7 to the optical output end of the probe.

The lens system 6 is slidable within the hollow tube 3 and, when pushed in place, mechanically locks the bed of the lamp 8. This lamp may thus be put into its bed through the corresponding window and then locked therein. Of course another way of setting the lamp 8 at its due place will be to affix this lamp through part of its socket to the end of the optical unit.

As clearly shown by the drawing, this optical lens system gets an oblique vision of the field of the picture it transmits. This field will be illuminated either by the inspection lamp 8 or by the flash tube 18, as will be hereinafter described.

Figure 2:
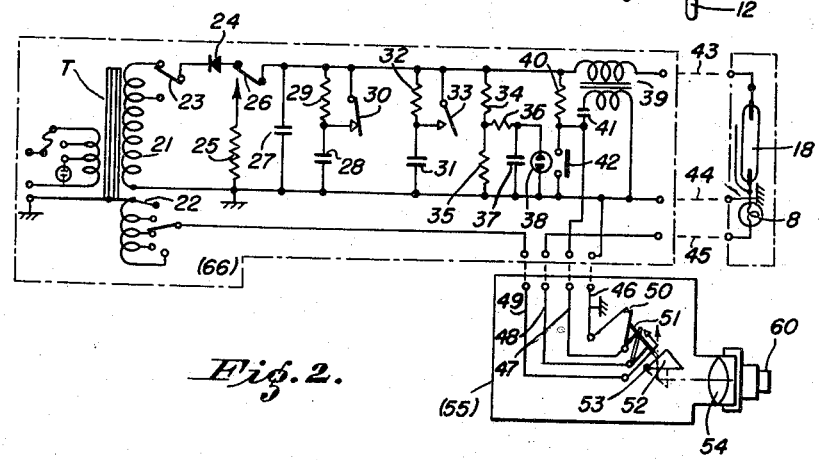
Fig. 2 shows the electrical diagram of an endoscopic device according to the invention and embodying this probe.

By way of example, a screwed part 5 is shown at the end of the probe for affixing this probe, once introduced within the body of a patient, onto a sleeve 60, Figs. 2 and 3, of a photographic camera 55. This camera is for instance of the well-known kind of the standard 35 mm. film. The light from the probe will pass through the objective 54 of this camera and will follow therewithin one of the two following paths: when a total reflecting prism 52 hinged at 53 is in its rest position, Fig. 3(a), the light will be reflected towards a mirror 57 and from this mirror towards a display surface at the end of a tube 58; when on the other hand, Fig. 3(b), the prism 52 will be in its work position, clearing the inlet 56 whilst blocking the preceding light path, the picture will be projected through the objective 54 onto the photosensitive film (not shown). The rest position corresponds to the light formed from the reflection in the inspected cavity of the light issuing from the inspection lamp 8. The work position corresponds to the light reflected back from the said cavity under the flash illumination from the flash tube 18. As it will be hereunder detailed, the lamp 8 will preferably be switched off during any flash from the tube 18 in order that the colour of this illumination be wholly preserved.

As indicated in Fig. 4, the camera may be converted, if needed, into an apparatus for projecting the pictures obtained from the endoscope. The rear wall of the camera is replaced by a light box comprising, within a housing 64, a lamp 65, an optic 63, and a film-guideway 62 together with a film-setter 61 in this guideway. Of course, the prism 52 is maintained in its upwards condition during the projection of these pictures.

As seen, the endoscopic probe includes a flash tube 18, of a miniaturized type, and also a low-voltage inspection lamp. As said also, the activation electrode of the flash tube is connected to the hollow body 3 of the probe and, of course, this conducting body must be connected to ground in order to avoid any risk of electrocuting the patient being examined. In an endoscopic device according to the invention, an important feature in this respect lies in the provision of a common ground of the three elements: probe, camera housing, and voltage generator, and important features also lie in the arrangement proper of this voltage generator so that its handling may be made quite safe and flexible in itself.

All live wires will be actually contained within a Faraday cage and, in the voltage generator, it will be the positive pole or terminal of the rectifying circuit which is connected to the ground, this being in contradistinction with the current practice of voltage generators of this kind. Of course, the overall volume of this generator must be made as small as possible.

The electrical diagram of this voltage generator is shown in Fig. 2. It includes an input transformer T the primary winding of which is provided with several taps for connection to several mains of different voltages, as the case may be. This transformer is made with two separate secondary windings. The secondary winding 21 is adapted for the supply of the flash voltage to the flash tube 18. The secondary winding 22 is adapted for the supply of the low voltage to the lamp 8. Electrostatic shields are provided between the windings of this transformer and connected to the ground.

One end of the secondary winding 21 is put to the ground. The other end is connected, when a contact switch 23 is set in its upper position, to a rectifier cell 24 which delivers a high negative rectified current to the lead 43 which connects to one of the electrodes of the flash tube 18 through a series secondary winding of a transformer 39. Of course, a rectifier of the full wave kind may be used if needed. In either case, the rectifier 24 must be able to charge at least one condenser such as 27, of the electrochemical kind for instance.

For practical purposes, further, several other condensers such as 28 and 31 are also inserted between the high negative voltage lead and the ground lead of the generator, through a series resistor 29 for the condenser 28 and through a series resistor 32 for the condenser 31. The resistor 29 may be short-circuited at will from the switch contact 30 and the resistor 32 may also be short-circuited at will from the switch contact 33. The additional condensers such as 28 and 31 will serve for the adjustment of the energy of the flashes. It is to be understood that from the use of a flash tube, and when the photgraphic film used is of the "daylight" kind, a very good reproduction of the picture colors can be obtained provided the energy of the flash is proportioned to the distance between the picture field and the camera input as well as to the average light reflected from this picture field and to the quickness of the emulsion of the film. The energy of any flash occurring in a device according to the invention depends on the energy stored in condensers. Consequently the best practical way for adjusting the energy of the flashes will be the adjustment of the overall capacity of these condensers. If an adjustment of the input voltage were used, an anticipation must occur for the charge of the condensers: if the operator had anticipated a too much higher charge, he would be obliged to discharge all the condensers and wait for a further charge under a changed voltage condition.

Of course, the user finds anyway a possibility of discharging all the condensers as an inverter switch 26 is provided to this end. When turned to its lower position, this switch makes a discharge path available for the condensers through a suitable resistor 25. This inverter switch 26 further enables the device to be operated as a mere endoscope for inspection only, when needed, without any charge of the condensers.

In the described arrangement, an adjustment may be made at the very instant when, all condensers being charged, the practitioner wishes to use part of this charge only for driving the flash tube. In such a case, he merely opens such short-circuiting contacts as 30 and/or 33. This will give to the discharge path of the unshort-circuited resistors such time constant that the condensers therein will not be discharged during the activation time interval of the flash tube proper. Such a short-circuit action does not give rise to any destructive sparking within the voltage generator, though effecting the required in and out switching operations of the additional condensers. Of course, in any case, it will be the charge of the main condenser 27 which will control the discharge, together with the charge stored within a much smaller condenser 41, the circuit of which is as follows:

This condenser 41 is connected in series with the primary winding of a high frequency transformer 39, the secondary winding of which is, as said, serially inserted in the lead 43. In addition, the core of this transformer is made of such a magnetic material as ferrite and consequently the transmission between its primary and secondary windings results in a high peaked distorted voltage pulse. The end of the primary winding opposite to the end connected to the condenser 41 is connected to the ground lead 44. Through a resistor 40, the condenser 41 is connected to the high negative voltage lead of the generator. Consequently this condenser 41 will be charged during the same time interval as will be charged the other condensers of the generator.

The primary winding circuit of transformer 39 is open as long as no flash is wanted at a switch contact included in a switch 51. This switch 51 is mounted upon the camera and the armatures thereof are mechanically connected to the control lever (not shown) of the prism 52. This lever will preferably be spring-actuated for a quick action. When the practitioner will operate this lever, the prism 52 will be brought in its upwards position, as indicated on the drawing, and simultaneously once this is effected, the contact will be closed between the leads 47 and 46 so that the condenser 41 will suddenly discharge through the primary winding of the transformer 39. The distorted high peaked voltage appearing on the lead 43 will fire the flash tube and all the other condensers will suddenly enter into the discharge, except the ones for which the series resistors are not short-circuited.

The same will occur when, for a systematic trial, the operator will push a trial contact 42, as apparent from the diagram.

On the other hand, the supply circuit for the inspection lamp 8 passes through another contact of the inverter 51, leads 48 and 49, from the secondary winding 22 to the ground. When the said inverter 51 changes its condition, its circuit is broken and the inspection lamp cut off; this action occurs before the flash tube is activated. The sequence of events is met from a suitable arrangement of the contacts in the inverter 51 which is, as said, mechanically driven by the practitioner.

The inverter 51 is, as shown, a two-armature one. Of course, a single-pole inverter may be used, if wanted, the armature of which will be put to ground and will then switch this ground from the circuit of the inspection lamp 8 to the primary winding of the transformer 39.

It is apparent that the practitioner cannot see the light flash and consequently is unable to check the condition of the charges on the generator condensers, when no special means is provided in this respect. Such checking means are herein constituted as follows: a neon tube 38, or a glow tube of any other suitable kind, is inserted between the ground lead and the output point of a voltage integrating network comprising, as conventional, a resistor 36 and a condenser 37. This integrating network is supplied from the high negative voltage lead from a potentiometer or voltage divider arrangement 34—35. This constitutes a relaxating circuit and consequently the neon tube twinkles at the relaxation frequency, when the condensers are charged but this twinkling stops when the discharge has occurred in the generator and when, consequently, the flash tube has been correctly fired.

In Fig. 2, the probe is only represented by its electrical elements, viz. the lamp 8 and the tube 18.

From the above, the use of the described device can be made quite clear: once the probe inserted in the cavity to inspect, the camera is affixed to the end of this probe and the electrical connections made from the probe to this camera and to this voltage generator. When the practitioner plugs-in the camera, the inspection lamp 8 is supplied and the inspection can occur. When the practitioner activates the generator and adjusts this member, the operation of the camera lever fires the generator and the flash tube.

What is claimed is:

1. A device for endoscopic purposes and the like comprising in combination, a single endoscopic probe to be introduced into the cavity to be inspected, and containing within a unitary hollow elongated housing a miniaturized flash tube, a low-voltage inspection lamp and an optical lens system retransmitting to the open end of the probe any light flux picked up from the said cavity, a photographic camera receiving upon its objective the said light flux from the probe and a voltage generator for supplying of both the said flash tube and inspection lamp within the probe, the said flash tube and the inspection lamp being placed in registry with respective windows cut in the metallic housing of the probe and each having a terminal connected to the said housing to which an electrical ground is applied, and the external activation control electrode of the flash tube also being connected to the said metallic housing, each further terminal of the flash tube and inspection lamp being supplied through an electrical insulated wire running to an input sealed-in connection along the said optical lens system which extends from a window of the said housing to the open end of the probe.

2. A device according to claim 1 wherein the flash tube is mechanically and electrically mounted within a removable end part of the probe and its electrical connection to the said wire is automatically effected by a plug-in arrangement when the said end part of the probe is affixed to the main portion, said main portion including the inspection lamp, optical lens system and the said supply wires.

3. A device according to claim 2 wherein the said main portion of the housing of the probe a single window is provided both for passing the light from the inspection lamp to the outside and for collecting the light from the outside upon an oblique end part of the optical lens system, said inspection lamp being supported within a bed which is locked in place when the unitary optical lens system is pushed at its operative place within the housing of the probe.

4. A device according to claim 1 wherein the external activation control electrode of the flash tube comprises an external metallization of the glass bulb of this tube opposite to the window of the probe housing, and this metallization, integral to or applied upon the glass, is light-reflecting.

5. A device according to claim 1, wherein the activation circuit for the flash tube, carrying a high negative voltage, passes through a make-and-break contact mounted upon the photographic camera and actuated, for the activation of the said flash tube, through a mechanical action which also and priorly switches within the said camera a display inspection light path and a straight-through path to the photographic film therein.

6. A device according to claim 5, wherein further the supply circuit of the inspection lamp also passes through a further contact on the said camera and is opened when the said mechanical actuation means is operated before the activation of the flash tube.

7. A device according to claim 1, wherein the said voltage generator includes at least in combination with an A. C. supply rectifier, a main charge condenser and an overshoot voltage condenser, this main charge condenser being connected between the high negative voltage lead and a ground lead and this overshoot voltage condenser being charged from the said negative high voltage lead and inserted in series with the primary winding of a transformer the secondary of which is serially connected to the said high negative voltage lead to the flash tube, a short-circuit being prepared for this overshoot voltage condenser through this primary winding at the said make-and-break contact on the photographic camera.

8. A device according to claim 7, wherein additional condensers are placed in parallel to the said main charge condenser, each one of the said additional condensers being in series with a resistor and each resistor being provided with a manually operated short-circuiting switch.

9. A device according to claim 7, and including a manually operated inverter switch connecting in one position the output of the said rectifier to the said high negative voltage lead and, in the other position, the said lead to the ground through a series resistor.

10. A device according to claim 7, wherein a neon tube is supplied from the output of an integrating network fed from a potentiometer inserted between the leads of the generator, and acting as a relaxation arrangement and charge displaying indicator.

11. A device according to claim 7, wherein a manually operated switch is placed within the said generator for a systematic check thereof by a short-circuit to the ground of the said overshoot voltage condenser.

References Cited in the file of this patent

UNITED STATES PATENTS

| | | |
|---|---|---|
| 1,680,491 | Wappler et al. | Aug. 14, 1928 |
| 1,880,551 | Wappler | Oct. 4, 1932 |
| 2,077,792 | Hein | Apr. 20, 1937 |
| 2,280,561 | Wappler | Apr. 21, 1942 |
| 2,550,698 | King et al. | May 1, 1951 |
| 2,665,617 | Marcouiller | Jan. 12, 1954 |
| 2,691,918 | Robins et al. | Oct. 19, 1954 |

FOREIGN PATENTS

| | | |
|---|---|---|
| 179,173 | Great Britain | July 26, 1923 |